(12) United States Patent
Kim et al.

(10) Patent No.: US 9,093,101 B2
(45) Date of Patent: Jul. 28, 2015

(54) STACK INCLUDING A MAGNETIC ZERO LAYER

(75) Inventors: Jai-Young Kim, San Ramon, CA (US); Thomas P. Nolan, Fremont, CA (US); Kyongha Kang, Fremont, CA (US); Shoutao Wang, San Jose, CA (US); Vincent D. Nguyen, Pleasanton, CA (US); Abebe Hailu, San Jose, CA (US); Charles C. Chen, Fremont, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 371 days.

(21) Appl. No.: 13/037,288

(22) Filed: Feb. 28, 2011

(65) Prior Publication Data

US 2012/0219827 A1    Aug. 30, 2012

(51) Int. Cl.
- *G11B 5/66* (2006.01)
- *G11B 5/82* (2006.01)
- *G11B 5/73* (2006.01)

(52) U.S. Cl.
CPC .............. *G11B 5/82* (2013.01); *G11B 5/7325* (2013.01); *G11B 5/66* (2013.01)

(58) Field of Classification Search
None
See application file for complete search history.

(56) References Cited

U.S. PATENT DOCUMENTS

| | | | |
|---|---|---|---|
| 5,750,270 A * | 5/1998 | Tang et al. | 428/611 |
| 6,610,424 B1 | 8/2003 | Acharya et al. | |
| 6,656,613 B2 * | 12/2003 | Litvinov et al. | 428/827 |
| 6,730,420 B1 * | 5/2004 | Bertero et al. | 428/831.2 |
| 6,815,083 B2 * | 11/2004 | Nemoto et al. | 428/828.1 |
| 6,893,542 B1 * | 5/2005 | Chen | 204/192.2 |
| 7,056,605 B2 * | 6/2006 | Kawada | 428/832.1 |
| 7,264,892 B2 | 9/2007 | Ajan et al. | |
| 7,384,699 B2 * | 6/2008 | Nolan et al. | 428/829 |
| 7,510,788 B2 * | 3/2009 | Kawada | 428/828.1 |
| 7,604,879 B2 * | 10/2009 | Gouke | 428/831 |
| 7,846,564 B2 | 12/2010 | Li et al. | |
| 7,867,637 B2 | 1/2011 | Girt et al. | |
| 2003/0157375 A1 * | 8/2003 | Uwazumi et al. | 428/694 TP |
| 2005/0153168 A1 * | 7/2005 | Oh et al. | 428/694 T |
| 2005/0227123 A1 | 10/2005 | Ajan | |
| 2007/0042226 A1 | 2/2007 | Marinero et al. | |
| 2007/0082231 A1 * | 4/2007 | Nakamura et al. | 428/832.1 |
| 2007/0141401 A1 | 6/2007 | Maeda et al. | |
| 2007/0188924 A1 * | 8/2007 | Tamai et al. | 360/135 |
| 2008/0090106 A1 | 4/2008 | Braunstein et al. | |
| 2009/0081483 A1 * | 3/2009 | Sonobe et al. | 428/828 |
| 2009/0109579 A1 | 4/2009 | Takahoshi et al. | |
| 2009/0141399 A1 * | 6/2009 | Sakawaki et al. | 360/135 |
| 2009/0324973 A1 | 12/2009 | Taguchi | |
| 2010/0007988 A1 | 1/2010 | Igarashi et al. | |
| 2010/0247965 A1 | 9/2010 | Onoue | |
| 2011/0141609 A1 | 6/2011 | Bian et al. | |

* cited by examiner

*Primary Examiner* — Kevin Bernatz
(74) *Attorney, Agent, or Firm* — Hollingsworth Davis, LLC

(57) ABSTRACT

A stack including a crystallographic orientation interlayer, a magnetic zero layer disposed on the interlayer, and a magnetic recording layer disposed on the magnetic zero layer is disclosed. The magnetic zero layer is non-magnetic or has a saturation magnetic flux density ($B_s$) less than about 100 emu/cc. The magnetic zero layer and the magnetic layer include grains surrounded by a non-magnetic segregant. The magnetic zero layer provides a coherent interface between the interlayer and the magnetic layer with a lattice mismatch less than about 4%.

20 Claims, 12 Drawing Sheets

STACK INCLUDING A MAGNETIC ZERO LAYER

SUMMARY

A stack includes a magnetic zero layer interposed between a crystallographic orientation interlayer and a magnetic layer. The magnetic zero layer is non-magnetic or is a magnetic layer having a low saturation magnetic flux density (e.g., a layer having $B_s$ less than about 100 emu/cc) and comprises grains separated by a non-magnetic segregant. The magnetic layer includes ferromagnetic grains separated by a non-magnetic segregant. The lattice mismatch between the interlayer and the magnetic layer across the magnetic zero layer is less than about 4%.

DETAILED DESCRIPTION

Figure 1:
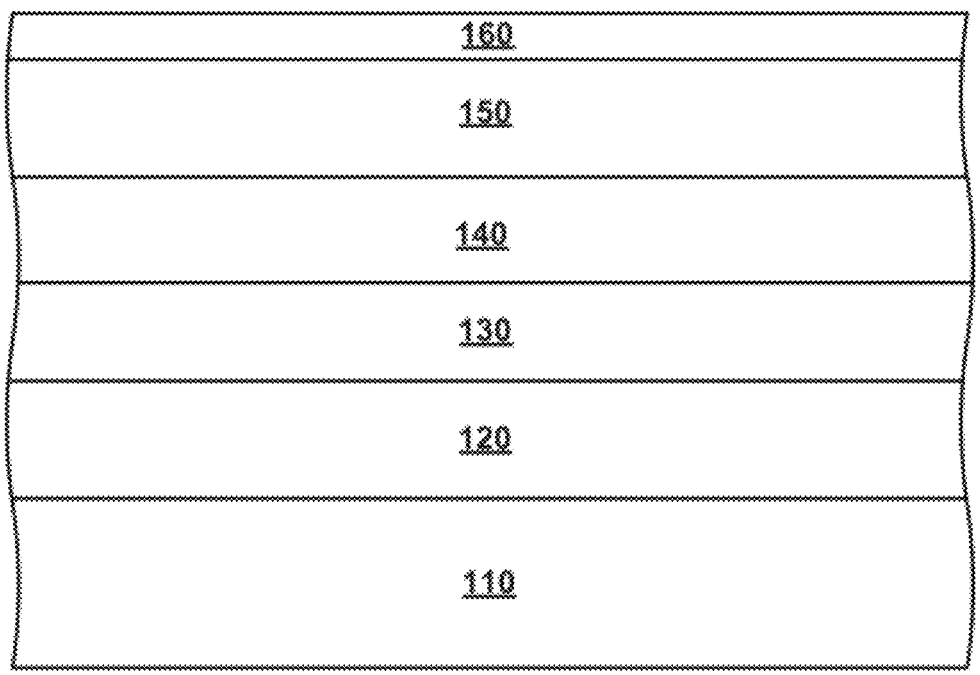
FIG. 1 is a conceptual diagram of an example magnetic stack.

In general, the disclosure relates to a stack that includes a layer (referred to herein as a "magnetic zero" layer) interposed between a crystallographic orientation interlayer and a granular magnetic layer having magnetic grains separated by a non-magnetic material such as an oxide. In some cases, the magnetic zero layer is a non-magnetic layer or a magnetic layer having a low saturation magnetic flux density ($B_s$) that forms part of a perpendicular magnetic recording medium used for magnetic data storage. The inclusion of the magnetic zero layer between the crystallographic orientation interlayer and magnetic recording layer can enhance the recording and/or reliability properties of a stack that forms a magnetic recording medium and/or can enhance the processes used to fabricate the magnetic recording medium. For example, when compared to substantially similar stacks that do not include such a magnetic zero layer, the inclusion of a magnetic zero layer may increase the magnetic coercivity ($H_c$) of the magnetic layer, increase the magnetic exchange decoupling of the magnetic layer as indicated, for example, by an increase in the difference between the magnetic coercivity and magnetic nucleation field ($H_c$–$H_n$) of the magnetic layer or the alpha parameter, increase the uniformity of exchange decoupling in the magnetic layer, decrease the bit error rate (BER) of the medium, increase the signal to noise ratio (SNR) of the medium, increase the areal recording density of the medium, and/or may enhance other properties of the magnetic recording medium.

In some examples, the magnetic zero layer allows the epitaxial growth axis between the crystallographic interlayer and the magnetic recording layer to be substantially maintained across the magnetic zero layer. In some cases, the use of a magnetic zero layer allows a coherent interface between the interlayer and the magnetic recording layer to be maintained. A coherent interface means that the lattices between the crystallographic interlayer and the magnetic layer are maintained in a substantially stoichiometric arrangement (substantially one to one matching mode) with elastic stress. When an interface is incoherent, the lattices change to a non-stoichiometric arrangement (non one to one matching mode) with released elastic stress. In some examples discussed herein, a coherent interface is maintained when the mismatch in the lattice constant between the interlayer and magnetic layer is less than about 4%.

The inclusion of the magnetic zero layer may allow the deposition pressure of one or more layers of the magnetic recording media to be reduced when compared to a deposition process that does not include the formation of a magnetic zero layer. The inclusion of a magnetic zero layer in conjunction with a lower pressure process may allow the magnetic recording properties of a magnetic recording medium to be maintained, optimized, or not substantially compromised in comparison with magnetic media formed using a higher pressure process in the absence of a magnetic zero layer. For example, the inclusion of a magnetic zero layer between the interlayer and magnetic recording layer may allow for the crystallographic interlayer to be deposited via sputtering at a relatively low sputtering pressure while providing superior magnetic recording properties when compared to a substantially similar medium without a magnetic zero layer. For example, as the magnetic zero layer may provide for an increase in exchange decoupling and/or an increase in the uniformity of the exchange decoupling in the magnetic recording layer, the interlayer may be deposited via sputtering at lower sputtering pressures that would typically be accompanied by a non-optimal level and/or non-uniformity of exchange decoupling and/or other degraded properties in the magnetic recording layer in the absence of the magnetic zero layer.

Although the disclosure is primarily described with regard to magnetic recording media such as perpendicular magnetic recording media for magnetic data storage, the magnetic layer structure described herein is not limited to such application but may also be utilized in other applications. For example, the magnetic layer structure described herein may be utilized in a magnetic sensor or magnetoresistive random access memory (MRAM). Magnetic media incorporating the magnetic zero layer described herein may be utilized in heat assisted magnetic recording, for example.

FIG. 1 is a schematic block diagram that illustrates a magnetic recording medium 100 including a magnetic zero layer 140 interposed between the crystallographic orientation interlayer 130 and the magnetic recording layer 150. As illustrated in the example of FIG. 1, a magnetic recording medium 100 may be sequentially composed of a substrate 110, one or more soft magnetic under layers (SUL) 120, a crystallographic orientation interlayer 130, a magnetic zero layer 140, a hard magnetic recording layer 150, and a protective overcoat layer 160.

The magnetic layer 150 of magnetic rerecording medium 100 may include magnetic grains surrounded by non-magnetic segregant material at the grain boundaries. The amount of exchange decoupling of a magnetic layer is related to the segregation of the magnetic grains. For example, in some implementations, the magnetic grains of the magnetic layer 150 may comprise a magnetic Co or CoCr alloy and the non-magnetic segregant may comprise an oxide.

Control of magnetic exchange decoupling in the magnetic layer of a magnetic recording medium, can be a factor in the dynamic recording performance of media, which may be measured in terms of bit error rate (BER), signal to noise ratio (SNR), areal recording density and/or other recording performance parameters, for example. An exchange decoupled magnetic layer may be formed by physical and/or chemical sputtering techniques that influence the growth of columnar magnetic grains separated by a non-magnetic segregant, e.g., an oxide.

For example, the formation of a magnetic layer comprising columnar magnetic grains can be facilitated by a shadow effect which occurs during high pressure sputtering deposition. The sputtering shadow effect facilitates segregation of the columnar magnetic grains and the disposition of non-magnetic segregant between the grains.

The crystallographic interlayer beneath a magnetic layer may first be deposited via sputtering with a high sputtering pressure (e.g., 20 to 200 mTorr) to form an interlayer having a crystallographic columnar grain structure. The magnetic recording layer may be deposited on the columnar crystallographic interlayer via sputtering using a high sputtering pressure (e.g., 20 to 200 mTorr) to form the magnetic columnar grains of the magnetic layer. Oxide segregation of the magnetic grains in magnetic layers may be achieved by reactive oxygen sputtering and/or by incorporating oxides in the sputtering targets.

According to various examples provided herein, a magnetic zero layer may be disposed between the crystallographic interlayer and magnetic layer. The magnetic zero layer can affect the amount of exchange decoupling present in the magnetic layer and/or the exchange decoupling uniformity of the magnetic layer. The magnetic zero layer may be used in additional to, or in lieu of, those techniques described above as well as other techniques for influencing the exchange decoupling within a magnetic recording layer.

In some instances, the use of higher pressure sputtering techniques to form columnar grain structure, e.g., of the crystallographic interlayer, are non-optimal because that can result in lower production yields due to re-deposition area, Ar gas incorporation, blister formation, poor mechanical performance, corrosion problems, and/or other effects.

In some cases, the incorporation of the magnetic zero layer may allow for deposition processes that include reduced deposition pressures, e.g. for the crystallographic interlayer. In some cases, the magnetic media formed by these reduced pressure processes may provide enhanced recording properties when compared to the magnetic recording properties of media formed at higher deposition pressures. In some cases, the magnetic properties of magnetic media formed by the reduced pressure processes may maintain recording properties that are substantially similar or that are not substantially degraded when compared to the magnetic recording properties of media formed at higher deposition pressures.

The formation of oxide separated grains in the magnetic layer through reactive sputtering using relatively high oxide content can result in lower production yields due to, for example, particle contamination, blister formation, steep performance gradient, and sputter arcing. High pressure and/or high oxide content can decrease film density and crystalline core packing fraction, both of which can negatively affect recording output signal and BER, reliability and/or other recording properties. Incorporation of the magnetic zero layer can allow for deposition of the magnetic layer using reduced oxide content when compared to the magnetic layer of a magnetic recording medium that does not include the magnetic zero layer.

Figure 2:
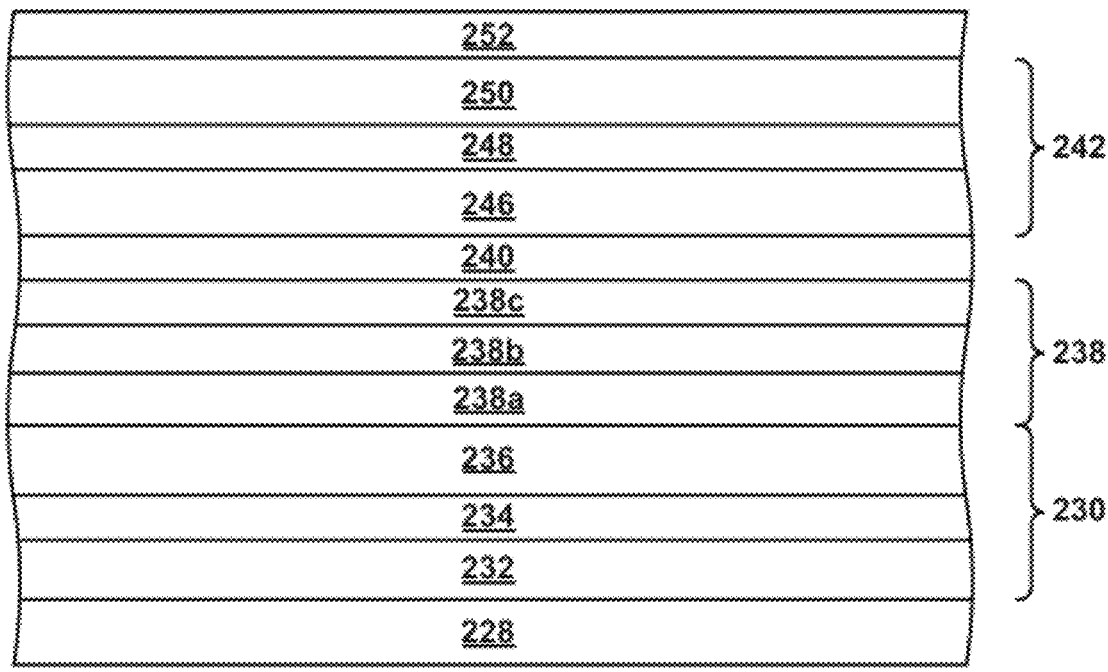
FIG. 2 is a conceptual diagram of an example magnetic stack that includes multiple magnetic recording layers and multiple interlayers.

FIG. 2 is a schematic block diagram illustrating an example magnetic recording medium 200. As shown in FIG. 2, magnetic recording medium 200 includes a substrate 228, a soft under layer (SUL) 230, a crystallographic orientation interlayer 238, a magnetic zero layer 240, a magnetic layer 242, and a protective overcoat 252.

Substrate 228 may include any material that is suitable to be used in magnetic recording media, including, for example, Al, NiP plated Al, glass, or ceramic glass. Although not shown in FIG. 2, in some embodiments, an additional underlayer may be present immediately on top of substrate 228. The additional underlayer may be amorphous and provides adhesion to the substrate and low surface roughness.

Soft underlayer (SUL) 230 is formed on substrate 228 (or the additional underlayer, if one is present). SUL 230 may be any soft magnetic material with sufficient saturation magnetization ($M_s$) and low magnetic anisotropy field ($H_k$). For example, SUL 230 may be an amorphous soft magnetic material such as Ni; Co; Fe; an Fe-containing alloy such as NiFe (Permalloy), FeSiAl, or FeSiAlN; a Co-containing alloy such as CoZr, CoZrCr, or CoZrNb; or a CoFe-containing alloy such as CoFeZrNb, CoFe, FeCoB, or FeCoC. SUL 230 may provide for a high permeability return path for the field from the poles of magnetic read/write head.

In some examples, SUL 230 may include multiple soft magnetic layers which may or may not be separated by non-magnetic spacer layers. In the example shown in FIG. 2, SUL 230 includes first SUL 232 and second SUL 236 formed of soft magnetic material separated by spacer layer 234. First and second SULs 232 and 234 may be formed of a soft magnetic material as described above. In one example, first SUL 232 and second SUL 236 may be a Co-based amorphous alloy, such as, e.g., an amorphous CoTaZr alloy, or a Fe-based amorphous alloy such as, e.g., an amorphous FeCoCrB alloy, and may have a thickness between approximately 50 angstroms and approximately 300 angstroms. The composition and thickness of first SUL 232 may be the same or different from that of second SUL 236.

Non-magnetic spacer layer 234 may be formed of any suitable substantially non-magnetic material such as, e.g., Cr, Ru, CoCr, Pt, or alloys thereof. In some examples, spacer layer 34 may function as an anti-ferromagnetic (AFC) coupling layer which induces anti-ferromagnetic coupling between first SUL 232 and second SUL 236. In some examples, to allow for AFC coupling, spacer layer 234 may be formed of Ru and may have a thickness between approximately 4 to approximately 6 angstroms or approximately 14 to approximately 18 angstroms, although other thicknesses are contemplated.

Crystallographic orientation interlayer 238 may be deposited on SUL 230. In some examples, the interlayer 238 may be used to establish a hexagonal close packed (HCP) crystalline orientation that induces HCP (0002) growth of the first magnetic layer 246, with a magnetic easy axis perpendicular to the film plane. Interlayer 238 may be formed of one or multiple layers. In some examples, interlayer 238 may include a columnar structure comprising columnar grains that provides a base for epitaxial growth of a columnar structure in one or more magnetic layer(s) of magnetic layer 242. As noted above, such columnar structure may be generated and/or enhanced by sputter depositing interlayer 238 by increasing the sputtering pressure to a relatively high level. The columnar structure of interlayer 238 may facilitate growth of a columnar structure in one or more layers of magnetic layer 242 to increase the magnetic exchange decoupling of the one or more layers of magnetic layer 242, such as the exchange decoupling of first magnetic layer 246.

In the example shown in FIG. 2, interlayer 238 includes a crystalline seed layer 238a, columnar seed layer 238b, and columnar decoupling layer 238c, in that order. Crystalline seed layer 238a may promote thin film growth for columnar seed layer 238b, which may result in the better crystallographic quality of columnar seed layer 238b. In some examples, crystalline seed layer 238a may include NiW, NiFe, NiFeW and alloys thereof, and/or RuCr and alloys thereof. Crystalline seed layer 238a may have a thickness between about 40 angstroms and about 120 angstroms.

Columnar seed layer 238b may be provided on top of crystalline seed layer 238a and may have a columnar grain structure to promote columnar growth in magnetic layer 242. As described above, in some examples, columnar seed layer 238b may be deposited via sputtering using relatively high sputtering pressure (e.g., between about 20 to about 200 mTorr) to promote columnar grain structure. In some examples, columnar seed layer 238b may include Ru, Co, or alloys thereof, and may have a thickness between about zero and about 100 angstroms.

Columnar decoupling layer 238c may be provided on top of columnar seed layer 238b. Columnar decoupling layer 238C may be deposited under the high sputtering pressure (e.g., in the range of about 20 to about 200 mTorr) to form the columnar structure, which provides the base for the formation of the columnar structure into first magnetic layer 246. In some examples, columnar decoupling layer 238c may be formed of Ru or Ru alloys, and may have a thickness between about 40 angstroms and about 200 angstroms.

In some examples, the general structure of interlayer 238 in FIG. 2 includes: crystalline seed layer 238a, deposited at a low sputtering pressure (e.g., about 2 to 20 mTorr) such as a crystalline seed layer structure with (111) textured FCC (face centered cubic) alloys, such as (111) Ni—W based alloys or (111) NiFe (permalloy)-W based alloys; columnar seed layer 238b, and which is a low sputtering pressure (e.g., about 2 to 20 mTorr) deposited columnar seed layer structure with (002) textured HCP (hexagonal closed packed) alloys, such as (002) Ru, (002) RuCr or (002) RuCoCr; and columnar decoupling layer 238c, which is high sputtering pressure (e.g., about 20 to 200 mTorr) deposited columnar layer structure with (002) textured HCP alloys such as (002) Ru or (002) RuCr.

The magnetic recording layer 242 may be formed on magnetic zero layer 240, which will be described further below. As shown in FIG. 2, magnetic layer 242 may include a first (bottom) magnetic layer 246, an exchange break layer 248 and a second (top) magnetic layer 250. To control the exchange decoupling in magnetic recording layers, such as perpendicular magnetic recording layers, first and second magnetic recording layers 246, 250 can be formed in exchange decoupled and coupled states, respectively. In a perpendicular medium, the magnetic anisotropies of first magnetic layer 246 and second magnetic layer 250 are each oriented in a direction substantially perpendicular to the plane of recording layer 242 (e.g., the magnetic easy axis of first magnetic layer 246 and second magnetic layer 250 may each be substantially perpendicular to the plane of recording layer 242).

Exchange break layer 248 may be used to adjust the vertical exchange coupling between first magnetic layer 246 and second magnetic layer 250. In some examples, exchange break layer 428 may be include Ru, RuCo based alloy, RuCoCr-oxide based alloy, where the oxide includes, for example, $SiO_2$, $TiO_2CoO$, $CoO_2$, $WO_2$, and/or $TaO_2$.

Each of first magnetic layer 246 and second magnetic layer 250 may be a granular layer, and may include magnetic grains separated from adjacent magnetic grains by voids and/or non-magnetic material. In some embodiments, at least one of first magnetic layer 246 and second magnetic layer 250 may include a Co alloy, such as Co in combination with at least one of Cr, Ni, Pt, Ta, B, Nb, O, Ti, Si, Mo, Cu, Ag, Ge, or Fe. In some embodiments, at least one of first magnetic layer 246 and second magnetic layer 250 may include, for example, a Fe—Pt alloy or a Sm—Co alloy. In some embodiments, at least one of first magnetic layer 246 and second magnetic layer 250 may include alternating thin layers of a Co alloy and a Pt alloy or a Co alloy and a Pd alloy. In some embodiments, at least one of the first or second magnetic layers 246, 250 may include substantially no non-ferromagnetic material between the grains. In embodiments that include grains separated by non-magnetic material, the non-magnetic material separating the grains in at least one of first magnetic layer 246 and second magnetic layer 250 may comprise an oxide, such as, for example, $SiO_2$, $TiO_2$, $CoO$, $CoO_2$, $WO_2$, $Cr_2O_3$, $B_2O_3$ and/or $TaO_2$.

In some examples, first magnetic layer 246 and second magnetic layer 250 may have a thickness between approximately 20 angstroms to approximately 200 angstroms, and may have substantially the same or different thicknesses as one another. Exchange break layer 248 may have a thickness between approximately 1 angstrom and approximately 30 angstroms.

In one example, first magnetic layer 246 may be formed of a CoCrPt alloy with oxide segregant such as $SiO_2$, $TiO_2CoO$, $CoO_2$, $WO_2$, and/or $TaO_2$, a FePt based or CoPt based $L1_0$ or $L1_1$ ordered granular alloy, or layers of a Co alternating with layers of Pt and/or Pd, and second magnetic layer 250 may be formed of a CoCrPt based alloy film including one or more of B, C, Ru, and an oxide segregant such as $SiO_2$, $TiO_2CoO$, $CoO_2$, $WO_2$, and/or $TaO_2$.

A protective overcoat 252, such as, for example, diamond like carbon, may be formed over perpendicular recording layer 250. In other examples, protective overcoat 252 may include, for example, an amorphous carbon layer that further includes hydrogen or nitrogen. Although not shown, in some examples, one or more suitable lubricant layers may be formed on top of protective overcoat 252.

A magnetic zero layer 240 is formed between magnetic layer 242 and interlayer 238. Interposing the magnetic zero layer 240 between the interlayer 238 and the magnetic layer 242 may reduce defects and/or increase uniformity of in the magnetic layer, thereby enhancing the recording performance of the magnetic layer. For example, if the magnetic layer 242 is formed directly on the interlayer 238, some of the magnetic grains of the magnetic layer 232 which lie close to the interlayer 238 may be bonded together or may have minimal non-magnetic material separating the grains. These defects lead to magnetic grains that have low or no exchange decoupling, and which degrade the exchange decoupling of the layer 242. In the absence of a magnetic zero layer, the magnetic layer that is in contact with the crystallographic interlayer tends to have a reduced exchange decoupling and/or reduced exchange decoupling uniformity when compared to the rest of the magnetic layer.

When the magnetic zero layer 240 is interposed between the interlayer 238 and the first magnetic layer 246, it is the magnetic zero layer 240 that contains many of the defects and/or non-uniformities that are associated with the initial deposition phase on the interlayer. However, because the magnetic zero layer 240 is non-magnetic (or has low $B_s$), the defects and/or non-uniformities that occur in the magnetic zero layer 240 can reduce the number of defects and/or the non-uniformity of the magnetic layer 242. The magnetic zero layer 240 may serve to increase segregation of the grains and/or provide for more uniform segregation of the grains of first magnetic layer 246, without damaging grain microstructure. In such a configuration, magnetic zero layer 240 may increase the exchange decoupling within one or more magnetic layers of magnetic layer 242, may increase the coercivity of the magnetic layer 242, may increase uniformity of exchange decoupling, and/or may provide other enhanced recording characteristics (SNR, BER, areal density, etc) when compared to a medium having substantially the same configuration but does not include magnetic zero layer 240.

In some implementations, the magnetic zero layer provides a coherent interface (less than 4% lattice mismatch) with elastic stress between the crystallographic interlayer and the magnetic layer. Without wishing to be bound by any particular theory, a coherent interface with elastic stress in the interlayer/magnetic zero layer/magnetic layer structure may be responsible for enhanced magnetic recording properties of the magnetic medium. When the magnetic zero layer provides a coherent interface between the interlayer and the magnetic recording layer, the coherent stress induced by the presence of the magnetic zero may result in an increase in the exchange decoupling of the magnetic recording layer. In some examples, a magnetic zero layer may provide for a coherent interface accompanied by increased exchange decoupling in the magnetic recording layer up to a threshold layer thickness of the magnetic zero layer. At thicknesses greater than the threshold amount, the magnetic zero layer may cause an incoherent interface between the CI and magnetic recording layer. The incoherent interface may result in a reduction in exchange decoupling of the magnetic recording layer.

For example, as described above, first magnetic layer 246 may be a more exchange decoupled layer relative to the second magnetic layer 250 and a second magnetic layer 250 may be a more exchange coupled layer than the first magnetic layer 246. In some example, by including magnetic zero layer 240 between first magnetic layer 246 and interlayer 238, the exchange decoupling within first magnetic layer 246 may be increased, e.g., beyond that exhibited a medium including a substantially similar configuration but without magnetic zero layer 240.

The increase in exchange decoupling in first magnetic layer 246 due to the inclusion of magnetic zero layer 240 may be influenced by an increase in the magnetic coercivity ($H_c$) of first magnetic layer 246 compared to substantially similar example media which do not include magnetic zero layer 246. In some examples, the $H_c$ of first magnetic layer 246 may increase by at least about 10 percent, or between about 2 to about 20 percent with the inclusion of magnetic zero layer 240. In some examples, the $H_c$ of first layer 246 may increase by at least approximately 3 percent, such as, e.g., by at least about 150 Oe compared to a medium including a substantially similar configuration but not including magnetic zero layer 40. In some example, due in part to the increase in exchange decoupling provided by magnetic zero layer 240, first magnetic layer 246 may exhibit a $H_c$ of at least about 2% and about 100 Oe, or about 5% and about 250 Oe, or about 10% and about 500 Oe. Such $H_c$ values for first magnetic layer may be greater than those achievable without the inclusion of magnetic zero layer 240, such as, e.g., those $H_c$ values achieved primarily due to the columnar structure and/or magnetic grain separation of first magnetic layer 240 as described above.

Similarly, the increase in exchange decoupling in first magnetic layer 246 due to the inclusion of magnetic zero layer 240 may be influenced by an increase in the difference between the magnetic coercivity and the magnetic nucleation field (Hc−Hn) of first magnetic layer 46 compared to substantially similar example media which do not include magnetic zero layer 46. In some examples, the difference between the magnetic coercivity and the magnetic nucleation field (Hc−Hn) of first magnetic layer 246 may increase by at least about 3 to about 20 percent with the inclusion of magnetic zero layer 240. In some examples, the Hc−Hn of first layer 246 may increase by at least about 5% to about 18%, such as, e.g., by at least approximately 150 Oe to about 500 Oe compared to a medium including a substantially similar configuration but not including magnetic zero layer 40. Such values for first magnetic layer may be greater than those achievable without the inclusion of magnetic zero layer 240, such as, e.g., those values achieved primarily due to the columnar structure and/or magnetic grain separation of first magnetic layer 240 as described above.

In some examples, the increase in exchange decoupling in first magnetic layer 246 due to the inclusion of magnetic zero layer 240 may be influenced by a decrease in the value of alpha, where alpha is equal to the magnetic coercivity divided by the difference between the magnetic coercivity of first magnetic layer 46 and the magnetic nucleation field of first magnetic layer 46 (i.e., alpha=Hc/(Hc−Hn)), of first magnetic layer 46 compared to substantially similar example media which do not include magnetic zero layer 46. In some examples, the alpha value of first magnetic layer 46 may decrease by at least about 1.5% to about 15% percent with the inclusion of magnetic zero layer 240. In some examples, the alpha value of first layer 46 may decrease by at least about 7% such as, e.g., by at least approximately 0.12 compared to a medium including a substantially similar configuration but not including magnetic zero layer 40. Such values of alpha for first magnetic layer may be less than those achievable without the inclusion of magnetic zero layer 240, such as, e.g., those alpha values achieved primarily due to the columnar structure and/or magnetic grain separation of first magnetic layer 240 as described above.

Magnetic zero layer 240 is preferably a non-magnetic layer but in some cases may be formed of magnetic and/or nonmagnetic components. In some examples, magnetic zero layer 240 may be a combination of magnetic elements and non-magnetic elements. Depending on the ratio of magnetic elements to non-magnetic elements, magnetic zero layer 240 may be a low $B_s$ magnetic layer or a non-magnetic layer. For example, the magnetic zero layer may have a saturation magnetic flux density, $B_s$, below about 100 emu/cc. In some examples, magnetic zero layer 40 may include at least one of Co, Cr, Ru, Pt and an oxide, such as, e.g., CoCr-oxide, where the oxide includes one or more of $SiO_2$, $TiO_2CoO$, $CoO_2$, $WO_2$, and/or $TaO_2$. In some examples the oxide or other segregant material is the same in the magnetic zero layer 240 as in the magnetic layer 242. In some cases, the magnetic zero layer includes the same elements as the magnetic layer.

The configuration of magnetic zero layer 240 may provide for a coherent interface between interlayer 238 and magnetic layer 242 wherein the lattice mismatch between these layers is less than about 4% as illustrated, e.g., in FIG. 5 described below. Elastic stress within the lattice may be present at the interface, which affects the properties of the materials. In some configurations, the magnetic zero layer may facilitate hetero epitaxial growth between the interlayer and the magnetic layer with delta in FWHM (Full Width Half Maximum) of crystallographic rocking curves between (002) Ru of the interlayer and (002) of the magnetic layer below about 0.3 degrees (as illustrated, e.g., in FIG. 6 described below). When the interface is converted from coherent to in-coherent interface, the lattices at the interface change to a non-stoichiometric arrangement (non one to one matching mode) with released elastic stress and the lattice mismatch is above 4% (FIG. 5) or the delta above 0.3 degree (FIG. 6).

The thickness of magnetic zero layer may between approximately 1 angstrom and approximately 1,000 angstroms, and may vary depending on the composition of magnetic zero layer 240. Some examples of a magnetic zero layer 240 have a thickness of less than about 30 angstroms or less than about 25 angstroms, or even less than about 15 angstroms.

In one example, magnetic zero layer 240 comprises a Co alloy having a Co concentration below approximately 75 atm %, such as, e.g., between approximately 20 atm % and approximately 70 atm %. The Co concentration may be such that the alloy is substantially nonmagnetic having a magnetic moment, $B_s$, below approximately 100 emu/cc. Additionally or alternatively, in some examples, magnetic zero layer 40 comprises a material having a HCP crystal structure, a (0001) growth orientation, and a lattice parameter substantially equal to the lattice parameter of the directly adjacent layer of interlayer 238 and/or directly adjacent layer of magnetic recording layer 242 (columnar decoupling layer 238c and first magnetic layer 246, respectively, in the example of FIG. 2).

Additionally or alternatively, magnetic zero layer 240 may include a granular alloy having crystalline HCP non-magnetic or low $B_s$ magnetic grain cores and an amorphous, non-magnetic grain segregation material. Example non-magnetic grain segregation material may include oxides (e.g., $SiO_2$, $TiO_2$, CoO, $CoO_2$, $WO_2$, and/or $TaO_2$), nitrides, carbides, and borides. The concentration of amorphous material may be substantially equal to or greater than the concentration of amorphous material in first magnetic layer 46 adjacent to magnetic zero layer 40. In some examples, the concentration of segregant material, e.g., amorphous material, in magnetic zero layer 40 may be greater than about 5 mol % and/or greater than about 10 vol %. In some examples, the crystalline grain cores may include alloying elements that reduce the magnetic saturation, $M_S$, of magnetic zero layer 40 while maintaining an HCP lattice parameter that is substantially similar to one or more of the adjacent layer of interlayer 238 and magnetic layer 242. Example alloying elements may include Cr, Pt, Ru, Mo, Mn, Ti, Cu, and other elements that alloy with Co as HCP solution at relatively low concentrations (e.g., about 20 to about 40 at %). For example, if Cr is included in the magnetic zero layer, the Cr content may be less than about 30%. In some cases, the alloy elements used for the magnetic zero layer may be different than the alloy elements used in the magnetic layer. In some cases, the alloy elements used in the magnetic zero layer may be the same as those used in the magnetic layer, although the proportions of the elements in the magnetic zero alloy may be different from the proportions of the elements in the magnetic layer.

The thickness of a magnetic zero layer may be inversely proportional to the segregant content. In some cases, the effectiveness of a thinner magnetic zero layer at enhancing the recording characteristics of the magnetic recording medium may be enabled by incorporating a relatively higher oxide content when compared to a thicker magnetic zero layer. As previously discussed, the amount of oxide (or other segregant) in the magnetic zero layer (e.g., in vol % and/or mol %) may be equal to or greater than the oxide content of the magnetic layer.

Figure 3:
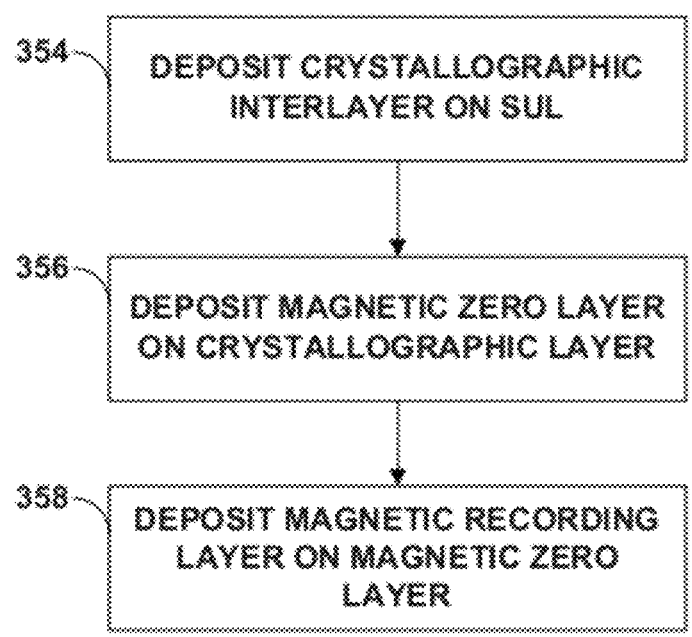
FIG. 3 is a flow diagram illustrating an example technique for making an magnetic stack.

FIG. 3 is a flow diagram illustrating an example technique for forming a magnetic recording medium having a magnetic zero layer between a interlayer and magnetic recording layer. In some cases, the magnetic zero layer is in direct contact with both the interlayer and the magnetic layer. For ease of illustration, the example technique of FIG. 3 is described with regard to the example recording medium 200 shown in FIG. 2. However, examples are not limited to such configurations.

As shown in FIG. 3, interlayer 238 may be deposited 354 on SUL 230. The deposition of interlayer 238 on SUL 230 may include the sequential deposition of crystalline seed layer 238a, columnar seed layer 238b, and columnar decoupling layer 238c. Magnetic zero layer 240 may then be deposited 356 on top of interlayer 238, e.g., directly on top of interlayer 238. Subsequently, magnetic layer 242 may be deposited 358 on magnetic zero layer 240, e.g., directly on magnetic zero layer. The deposition of magnetic layer 242 may include the sequential deposition of first magnetic layer 246, exchange break layer 248, and second magnetic layer 250.

Any suitable technique may be utilized to deposit interlayer 238, magnetic zero layer 240, and magnetic layer 242. In some examples, a DC magnetron sputtering process under vacuum may be used to form respective layers in interlayer 238, magnetic zero layer 240, and magnetic recording layer 242. Depending on layer properties, an individual layer may be formed using a single or multiple deposition steps. Despite the multiple deposition steps used to a form a layer, the layer may be referred to as a single layer in some instances.

The deposition technique used may be controlled based on predetermined layer composition, thickness, and other predetermined layer properties. For example, for granular layers, the sputtering may be performed in an oxygen environment to generate oxide segregating material in a deposited layer. In such an example, oxygen concentration may be varied to control the concentration of segregating material. Alternatively, a target including oxide material or other non-magnetic segregating material may be used to sputter deposit a layer having a optimized granular composition. As noted above, interlayer 238, magnetic zero layer 240, and/or magnetic layer 242 may be deposited via sputtering to form a granular layer. The magnetic zero layer 240 and magnetic layer 242 may be granular layers that include grains segregated by an oxide or other non-magnetic segregant.

As another example, as noted above, the sputtering pressure used during sputtering may influence the columnar structure of the resulting layer. In some examples, the sputtering pressure used when depositing one or more layers 238a-c of interlayer 238 and/or one or more layers 246, 250 of magnetic layer 242 may be selected such that the layer has a columnar structure. As noted above, in some examples, a sputtering pressure may be selected to provide a columnar structure for interlayer 238 and first magnetic layer 246. Such a columnar structure, separated by non-magnetic segregant, provides exchange decoupling in first magnetic layer 246. Example sputtering pressures used to deposit interlayer 238, magnetic zero layer 240, and/or magnetic layer 242 may range from approximately 2 to 200 mTorr, such as, e.g., approximately 60 mTorr to 120 mTorr.

In combination with the inclusion of magnetic zero layer 240 between interlayer 238 and magnetic layer 242, one or more variables of a deposition process used to form respective layers of medium 200 may be controlled to provide for magnetic layer 242 having a predetermined level of exchange decoupling and/or to provide for other properties. Example deposition variables may include sputtering pressure, the concentration of oxygen level used during reactive sputtering, and sputtering bias voltage. Example sputtering bias voltage used to deposit interlayer 238, magnetic zero layer 240, and/ or magnetic 242 may range from approximately 5V to approximately 500V, such as, e.g., approximately 75V to 275V.

In some examples, one or more of sputtering pressure, oxygen level concentration, and sputtering bias voltage may be adjusted relative those values used to form corresponding layer within a magnetic recording medium having substantially the same structure but without a magnetic zero layer. For example, due in part to the effects provided by the magnetic zero layer 240, e.g., increased exchange decoupling amounts and/or uniformity, increased coercivity, and/or other effects, interlayer 238c and/or first magnetic layer 246 may be deposited using a decreased sputtering pressure while still providing for an overall level of recording performance equal to or even better than a magnetic recording medium that does not include the magnetic zero layer. For example, the use of a magnetic zero layer may provide an overall level of exchange decoupling and/or coercivity in first magnetic layer 246 that is equal to or even greater than that of an example media including a interlayer 238 formed at a higher sputtering pressure but without a magnetic zero layer 240. In some examples, the sputtering pressure used to form interlayer 238c may be less than approximately 80 mTorr, and first magnetic layer 246 may still have an Hc greater than approximately 4700 Oe. In general, despite the adjustment(s) of one or more sputtering parameters in a manner that would generally decrease the exchange decoupling within first magnetic layer 246, the exchange decoupling within magnetic recording layer 242 may be substantially the same or even increased due to the inclusion of magnetic zero layer 240 between interlayer 238 and magnetic layer 242.

In some implementations, magnetic zero layer 240 may be provided between interlayer 238 and magnetic layer 242 to increase the exchange decoupling and/or coercivity of first magnetic layer 246. In some examples, magnetic zero layer 240 may allow for increased segregation of the magnetic grains of first magnetic layer 246 with less topographic roughness (surface roughness), lower concentration of reactive oxidation, and less total amorphous segregant volume within first magnetic layer 246. In such examples, during sputter deposition, first magnetic layer 246 may include core magnetic grains with substantially constant composition from a single sputter target, but the amorphous material volume within first magnetic layer 46 may be decreased by reactive oxidation as the layer grows. Such examples may allow for a predetermined level of exchange decoupling within first magnetic layer 246 using relatively low sputtering pressure (e.g., sputtering pressure between approximately 2 mTorr and 20 mTorr) to deposit interlayer 238, and may allow for interlayer 238 to be formed of FCC+Ru. Interlayer 238 formed of FCC+Ru may include examples in which the crystal structure of interlayer 238a is FCC (such as, e.g., (111) NiW, (111) NiFeW) with low sputtering pressures (e.g., 2 mTorr to 20 mTorr), the crystal structure of interlayer 238b is HCP (such as, e.g., (002) Ru, (002) RuCr) with low sputtering pressures (e.g., 2 mTorr to 20 mTorr), and the crystal structure of interlayer 238c is HCP (such as, e.g., (002) Ru, (002) RuCr) with high sputtering pressures (e.g., between 20 mTorr and 200 mTorr). In such cases, interlayer 238 is composed of an FCC layer (interlayer 238a) and HCP layers (interlayer 238b and interlayer 238c).

In some examples, even in instances in which interlayer 238 has a thickness below about 25 nm, first magnetic layer 246 may have a Hc–Hn of greater than approximately 2500 Oe and a lattice mismatch less than about 4%.

EXAMPLES

The following examples are illustrative of one or more embodiments of the disclosure, but do not limit the scope of the disclosure.

Example 1

Various example perpendicular magnetic recording media having a layer configuration substantially similar to that shown in FIG. 2 were prepared and evaluated. To evaluate the influence of a magnetic zero layer ("Mo layer") between the interlayer layer and magnetic recording layer, examples were generated to have magnetic zero layer thicknesses of 0 (i.e., no magnetic zero layer), approximately 2 angstroms, approximately 7 angstroms, approximately 16 angstroms, approximately 23 angstroms, and approximately 33 angstroms.

In each of the various examples, the bottom SUL was an amorphous FeCoCrB alloy with a thickness between about 100 and 200 angstroms; the AFC layer was an Ru alloy with a thickness between about 4 and 4 angstroms; the top SUL was an amorphous FeCoCrB alloy with a thickness between about 100 and 200 angstroms; the crystallographic seed layer was an amorphous NiW alloy with a thickness between about 60 and 100 angstroms; the columnar seed layer was an RuCr alloy with a thickness between about 40 and 80 angstroms; the columnar decoupling layer was an Ru alloy with a thickness between about 60 and 100 angstroms; the magnetic zero layer was a CoCr—($TiO_2$) material (with thicknesses varying as indicated above); the bottom magnetic layer was CoCrPt—($SiO_2$) with a thickness between about 60 and 100 angstroms; the exchange break layer was an RuCo alloy with a thickness between about 5 and 10 angstroms; and the top magnetic layer was a CoCrPt—($TiO_2$) layer with a thickness between about 20 and 50 angstroms followed by a CoCrPtB layer with a thickness between about 40 and 80 angstroms.

Figure 4A:
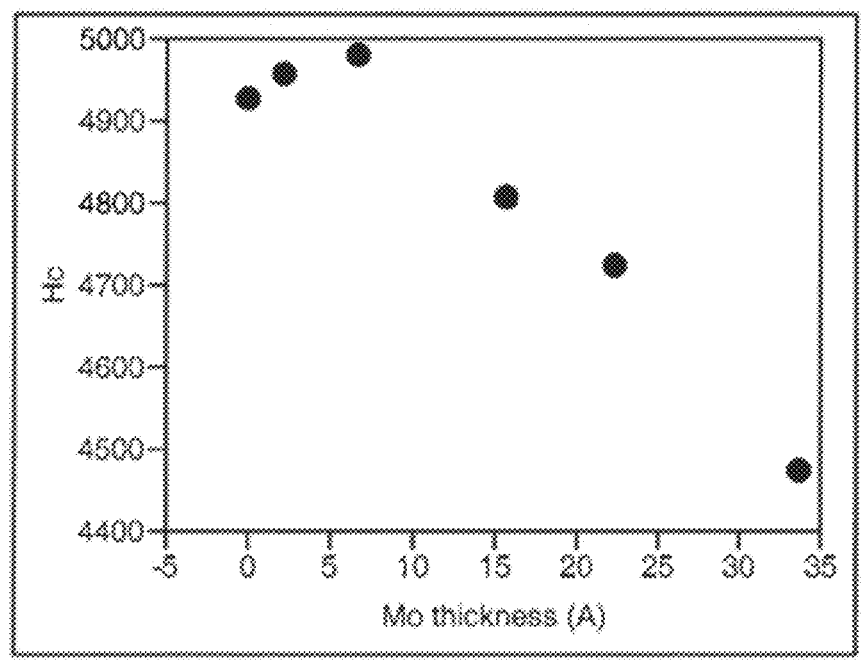
FIGS. 4a and 4b are plots illustrating the changes of magnetic coercivity ($H_c$) and delta of magnetic coercivity and magnetic nucleation field ($H_c$–$H_n$) versus magnetic zero layer thickness for various example stacks.
Figure 4B:
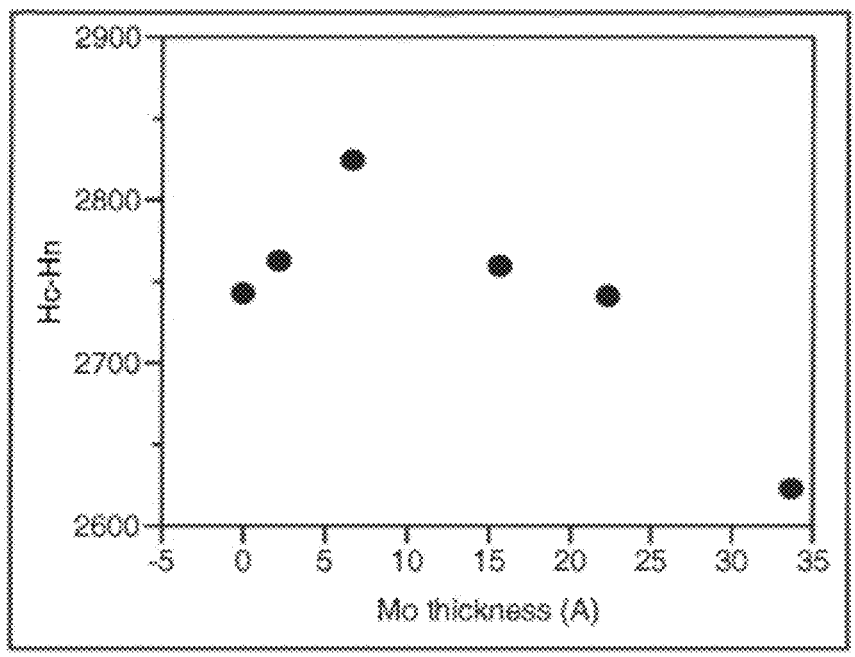

FIGS. 4a and 4b are plots showing the changes of magnetic coercivity ($H_c$) and delta of magnetic coercivity and magnetic nucleation field ($H_c$–$H_n$), respectively, for the bottom magnetic recording layer of the magnetic layer versus magnetic zero layer thickness for the example media. As shown, compared to the media without a magnetic zero layer between the crystallographic interlayer and magnetic recording layer (corresponding to a magnetic zero layer thickness of zero in FIGS. 4a and 4b), both the $H_c$ and $H_c-H_n$ values exhibited by the example magnetic recording media increase up to a layer thickness of approximately 7 angstroms and then decrease in a roughly monotonic fashion as the thickness of the magnetic zero layer increases beyond approximately 7 angstroms to approximately 33 angstroms. The increased in $H_c$ and $H_c-H_n$ illustrates that the inclusion of the magnetic zero layer enhances the exchange decoupling in example magnetic recording medium as compared to the comparative magnetic recording medium that does not include a magnetic zero layer.

Figure 5:
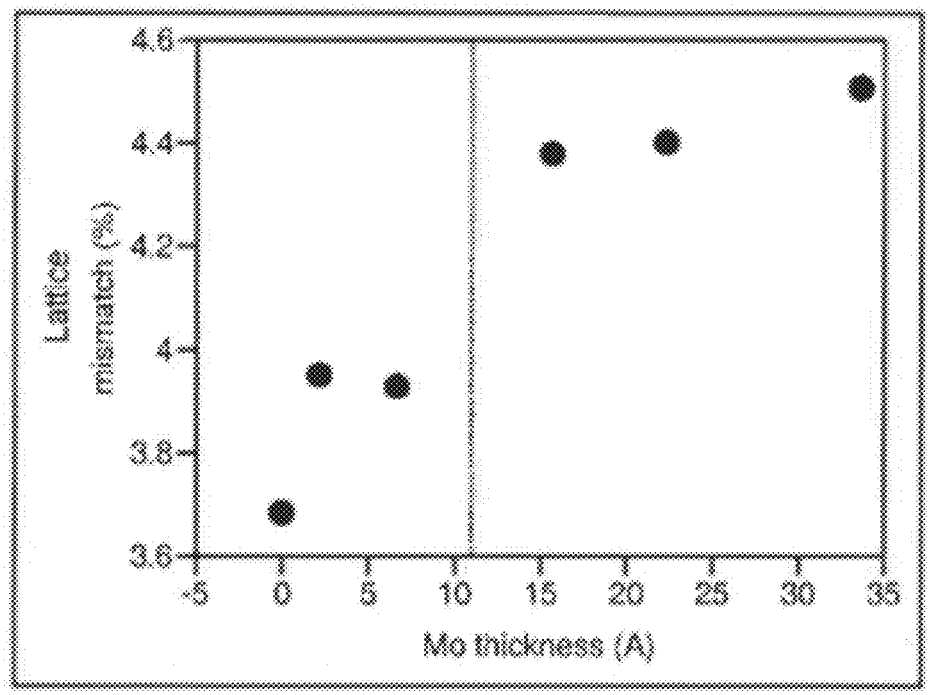
FIG. 5 is a plot illustrating the changes of the lattice mismatch between (002) Ru of the interlayer and (002) Co of the magnetic layer versus thickness of the magnetic zero layer for various example stacks.
Figure 6:
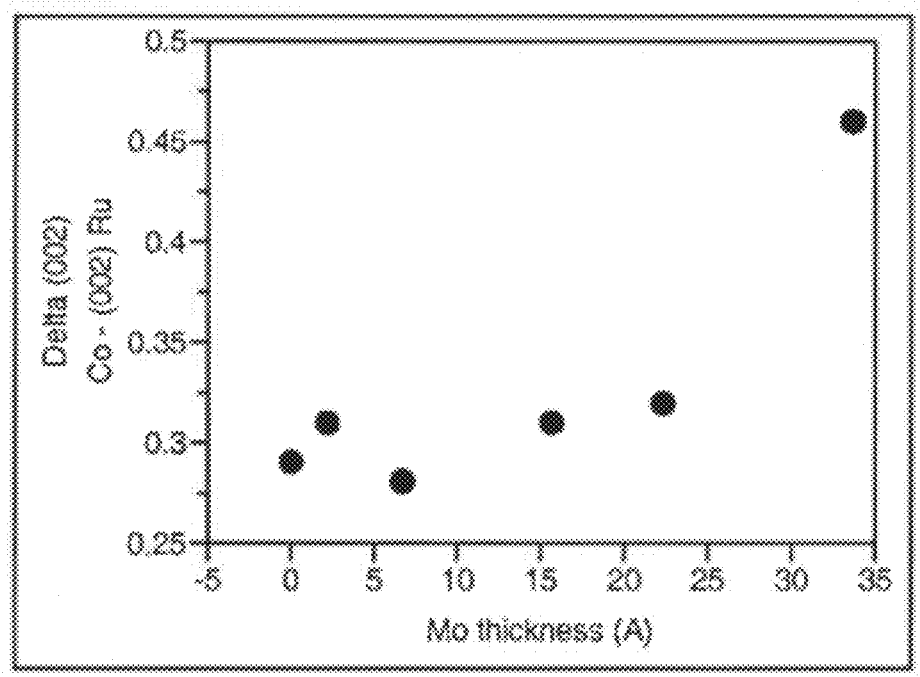
FIG. 6 is a plot illustrating the difference in FWHM (Full Width Half Maximum) of crystallographic rocking curves between (002) Ru of the interlayer and (002) Co of the magnetic recording layer versus magnetic zero layer thickness for various example stacks.

FIG. 5 is a plot showing, for the same example perpendicular recording media of FIGS. 4a and 4b, the changes of the lattice mismatch between (002) Ru of the interlayer and (002) Co of bottom magnetic recording layer versus magnetic zero layer thickness. As shown in FIG. 5, until the magnetic zero layer reaches a thickness of approximately 7 angstroms, the lattice mismatch was maintained below about 4%, indicating a coherent interface between (002) Ru of the interlayer and (002) Co of the magnetic recording layer. However, as the thickness of the magnetic zero layer increased beyond approximately 7 angstroms, e.g., at thicknesses of 15, 23, and 33 angstroms, the lattice mismatch increased above about 4.2 percent, indicating a substantially incoherent interface between (002) Ru of the interlayer and (002) Co of the magnetic recording layer.

Combined with the results of FIGS. 4a and 4b, the magnetic zero structure with the coherent interface appears to increase the induced stress at the interface as the increase of the lattice parameter strain under the constant Young's elastic modulus. Without being bound by any particular theory, this induced coherent stress may contribute to the enhancement of the exchange decoupling in perpendicular magnetic recording medium, which is consistent with the increase of $H_c$ and $H_c-H_n$ shown in FIGS. 4a and 4b. However, at magnetic zero layer thicknesses above about 15 angstroms, an increase of the lattice mismatch was observed along with the monotonic decrease of Hc and Hc-Hn displayed in FIGS. 4a and 4b, indicating that the incoherent interface by Mo structure reduces the exchange decoupling in the example perpendicular magnetic recording media. In some aspects, FIG. 5 suggests that the coherent interface between (002) Ru of the CI layer and (002) Co of the perpendicular magnetic recording layer, e.g., with associated elastic stress, may enhance the exchange decoupling in the perpendicular recording medium.

In some examples, to maintain the coherent interface between the (002) Ru of the CI layer and (002) Co of the perpendicular magnetic recording layer, the magnetic zero layer maintains the epitaxial crystallographic axis between the interlayer and magnetic recording layers. FIG. 6 is a plot illustrating the difference in FWHM (Full Width Half Maximum) of crystallographic rocking curves between (002) Ru of the interlayer and (002) Co of bottom magnetic recording layer versus magnetic zero layer thickness. As shown in FIG. 6, the presence of the magnetic zero layer does not substantially deteriorate the delta FWHM of the (002) Ru and (002) Co layers since the difference between the (002) Ru and (002) Co layers is relatively constant, except for the example in which the magnetic zero layer has a thickness of about 33 angstroms.

As shown in FIG. 5, a coherent interface between the interlayer (Ru layer) and the magnetic layer (Co layers) can be maintained by the lattice mismatch between two layers less than 4%. Further, as shown in FIG. 6, the epitaxial crystallographic axis between the Ru and Co layers can be maintained by the constant FWHM delta (difference between the rocking curves) between two layers below about 0.35 degrees. Therefore, in the example shown, the epitaxial crystallographic axis with the coherent interface between the Ru layer and the Co layers can be maintained by the combination of the lattice mismatch between the interlayer and the first magnetic layer below 4% and the constant FWHM rocking curves delta between the Ru layer and the Co layer below 0.35 degrees, which corresponds to a magnetic zero thickness below about 11 A. At a magnetic zero layer thickness of approximately 33 angstroms the magnetic zero layer formed an incoherent interface between the interlayer and the first magnetic layer, due to the lack of the epitaxial relationship between these two layers. The magnetic zero thickness between about 11 A and about 33 A can be regarded as the intermediate transition zone from the epitaxial coherent interface to the non epitaxial incoherent interface.

Example 2

To further evaluate the influence of including a magnetic zero layer between the interlayer and magnetic recording layer, three types of example magnetic recording media were prepared and evaluated. The first example media (referred to as TYPE A) was substantially the same as that used in Example 1 but without a magnetic zero layer. The second example media (referred to as TYPE B) and third example (referred to as TYPE C) had substantially the same configuration as the configuration used in Example 1 with a magnetic zero layer having a thickness of approximately 7 angstroms. However, the processes used to prepare the TYPE B and TYPE C examples varied. The sputtering process and disk structure of TYPE B were the same sputtering process and the disk structure to the TYPE A, except for the insert of the magnetic zero between interlayer layer and magnetic layer in the TYPE B media. The sputtering process and disk structure of the TYPE C media were the same sputtering process and disk structure as the TYPE B media, except for the use of a different sputtering process for the first magnetic record layer, see FIG. 2, first magnetic layer 246.

With reference to FIG. 2, a multiple step process was used for TYPE C media compared to TYPE B media. The sputtering process in the first magnetic record layer 246 for TYPE A and B media is referred to as a first sputtering process and for TYPE C media as a two step or multiple step process. In the first sputtering process in TYPE A and B, only one sputtering condition was applied during the deposition of the first magnetic recording layer 246. However, in the multiple step process in TYPE C, several sputtering conditions were sequentially applied during the deposition of the first magnetic record layer 246. For example, during half of the deposition duration (first half layer thickness) a lower bias voltage is applied and during the remaining half of the deposition duration (second half layer thickness) a higher bias voltage was applied. Such an example may be referred to as a two step deposition. When three different sputtering conditions are used for the first magnetic record layer 246, it may be referred to as a triple step deposition, and so forth. The changeable parameters for a multiple step sputtering process can be sputtering pressure, sputtering oxygen gas contents, sputtering bias voltages, sputtering sub layer thickness ratio, and the like.

As indicated in the following plots, the sputtering pressure used during sputtering of the Ru decoupling layer 238c of the interlayer 238 in each example medium was varied in each of the TYPE A-C examples. In particular, sputtering pressures of approximately 80, 90, 104, 120, and 140 mTorr were used.

As noted above, in some instances, an increase in sputtering pressure used to form the Ru decoupling layer 238c of the interlayer 238 can enhance the magnetic exchange decoupling of the magnetic layer 242 due to the induced columnar structure.

Figure 7A:
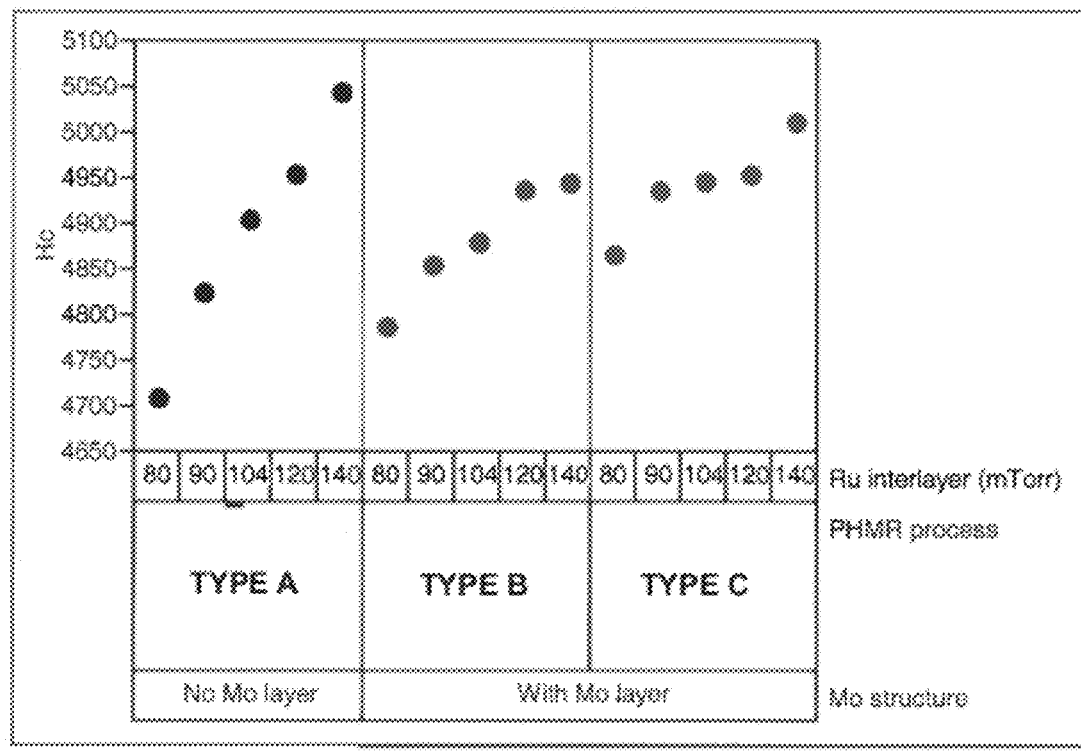
FIGS. 7a and 7b are plots showing magnetic coercivity ($H_c$) and delta of magnetic coercivity and nucleation field ($H_c$–$H_n$), respectively, versus sputtering pressure used to form an Ru interlayer for various example recording stacks.
Figure 7B:
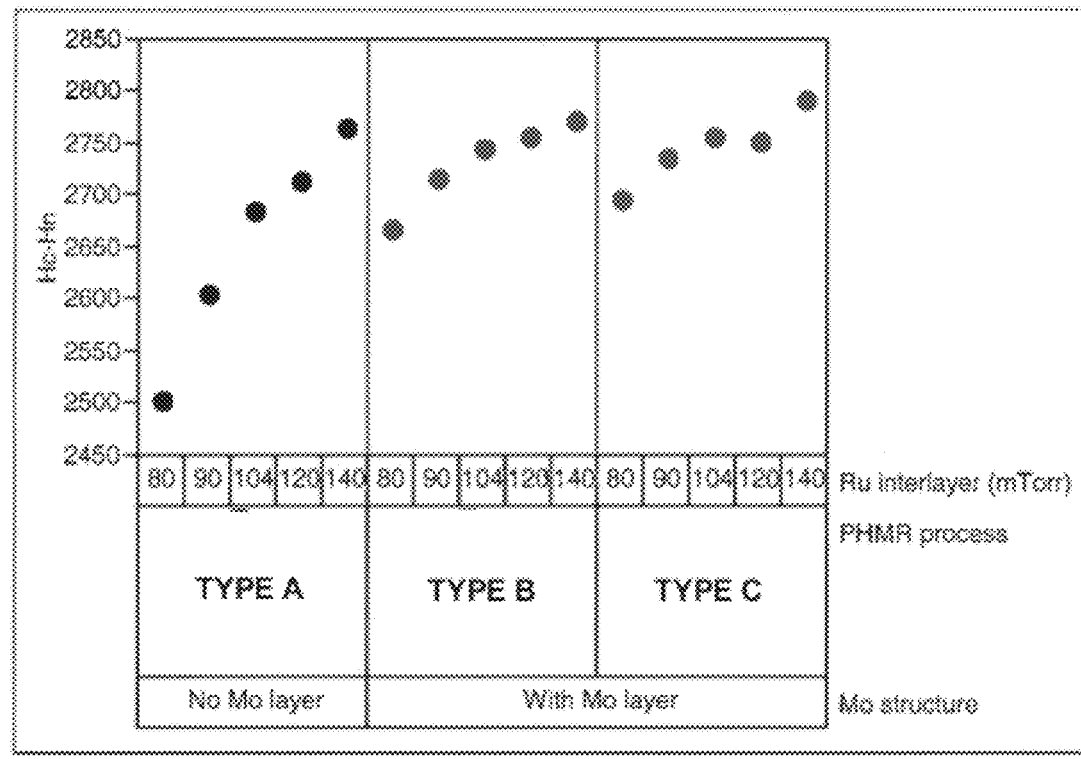

FIGS. 7a and 7b are plots showing the exchange decoupling level by magnetic coercivity ($H_c$) and delta of magnetic coercivity and nucleation field ($H_c$–$H_n$), respectively, in terms of sputtering pressure for the forming the interlayer 238 for the 3 types of example recording media, i.e., TYPES A-C. As shown in FIGS. 7a and 7b, compared to TYPE B media, TYPE A media exhibits a relatively rapid reduction of $H_c$ and $H_c$–$H_n$ as the Ru sputtering pressure decreased. This indicates that the magnetic zero layer in TYPE 2 disks provides enhanced exchange decoupling of the medium, even when relatively lower pressures are used for deposition of the interlayer.

For purposes of evaluation of the magnetic zero layer, another example exchange decoupling parameter, alpha, was evaluated. Alpha is equal to the magnetic coercivity divided by the difference between the magnetic coercivity and the magnetic nucleation field (i.e., alpha=Hc/(Hc–Hn)). Alpha may correspond to the slope of the second quarter of a hysteresis loop. When alpha is equal to one, the magnetic layer may be characterized as completely exchange decoupled. As the value of alpha increases from one, the magnetic layer may be characterized as progressing to being exchange coupled.

Figure 8:
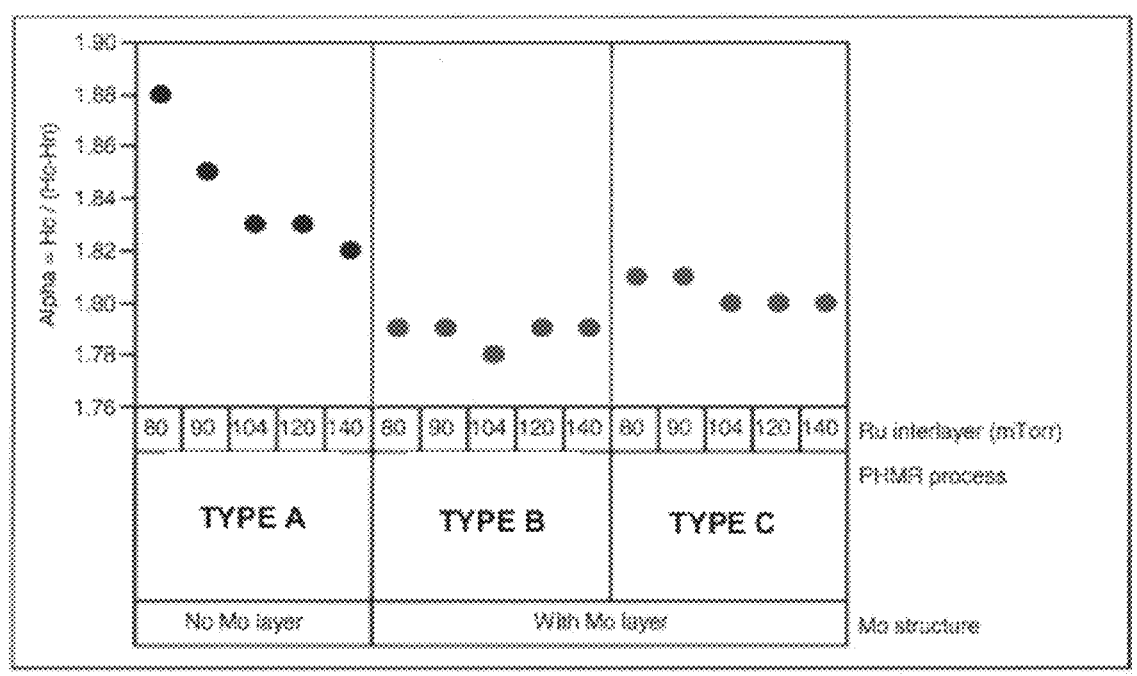
FIG. 8 is a plot illustrating the value of alpha for example stacks at various sputtering pressures used to form an Ru interlayer.

FIG. 8 is a plot illustrating the value of alpha for the magnetic layer for the 3 types of example perpendicular recording media, i.e., TYPES A-C, at the various sputtering pressures. As shown, the value of alpha for the TYPE A examples is reduced as the Ru sputtering pressure is increased, indicating that the Ru layer forms an exchanged decoupled columnar structure at higher Ru pressures. However, the alpha value for the TYPE B examples at lower pressures, e.g., 80 mTorr, display alpha values lower than that of even the highest sputtering pressure TYPE A example. Such results may indicate that magnetic zero layer induced increased exchange decoupling in the TYPE B examples compared to the TYPE A examples.

In some cases, because of the increased exchange decoupling displayed in the TYPE B examples compared to the TYPE A examples due to the inclusion of the magnetic zero layer, the exchange decoupling may be tailored to reach a target exchange decoupling (and/or other magnetic recording parameter) in the magnetic layer by controlling one or more process parameters during the fabrication of the magnetic medium. Example process parameters which may be adjusted to achieve the target exchange decoupling may include sputtering pressure, the concentration of reactive oxygen gas used for reactive sputtering, and sputtering bias voltage.

Figure 9A:
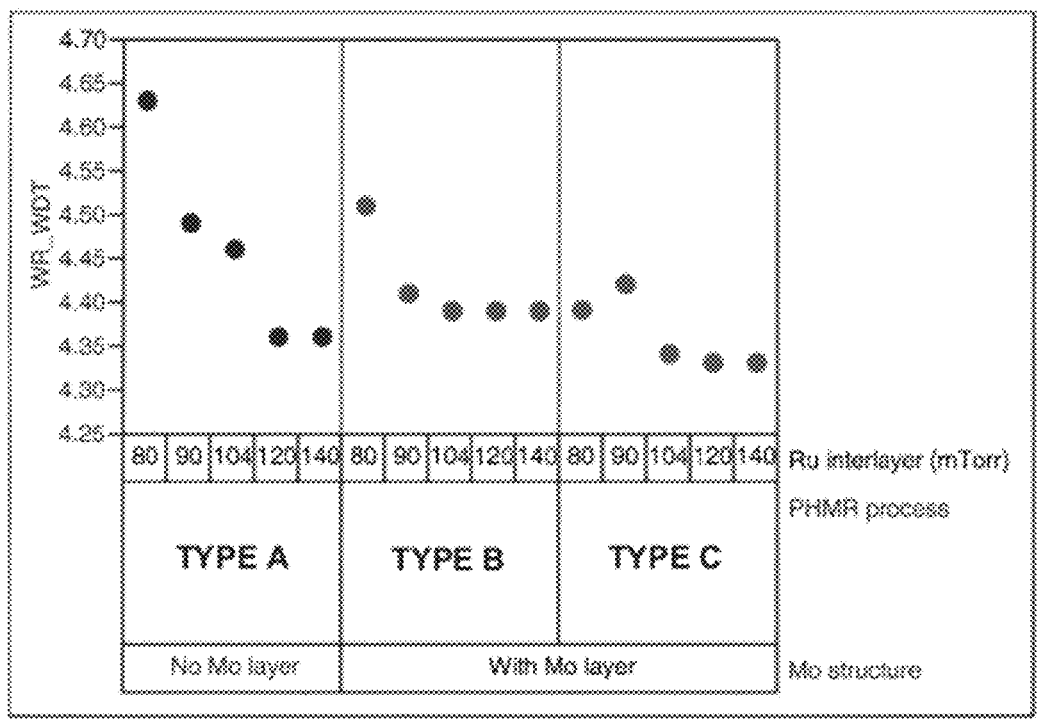
FIGS. 9a and 9b are plots illustrating the magnetic core width and magnetic writing width, respectively, for various types of example magnetic recording media.
Figure 9B:
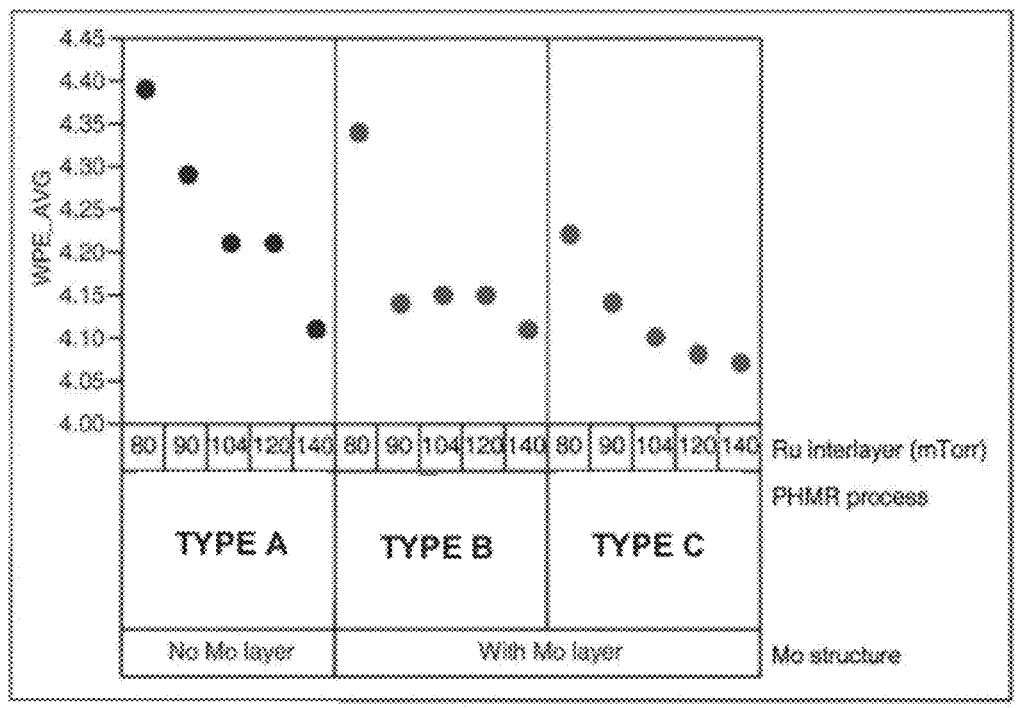

FIGS. 9a and 9b are plots illustrating the magnetic core width (WR_WDT) and magnetic writing width (WPE_AVG), respectively, for the 3 types of example perpendicular recording media, i.e., TYPES A-C, at the various sputtering pressures. The magnetic writing width is equal to the magnetic core width plus erase band. As shown, the narrower magnetic core width and magnetic writing width provided by the magnetic zero layer may allow for increased areal recording density capability (ADC).

Figure 10A:
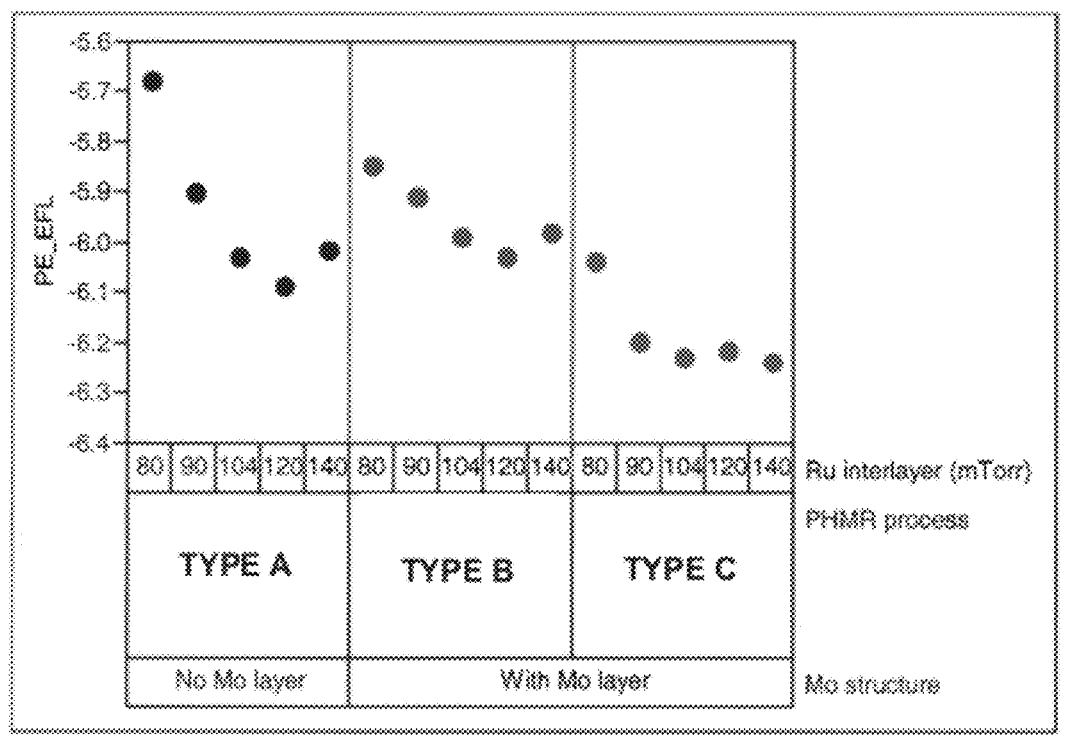
FIGS. 10a and 10b are plots illustrating the on-track bit error rate and squeezed off-track bit error rate, respectively, for various types of example magnetic recording media.
Figure 10B:
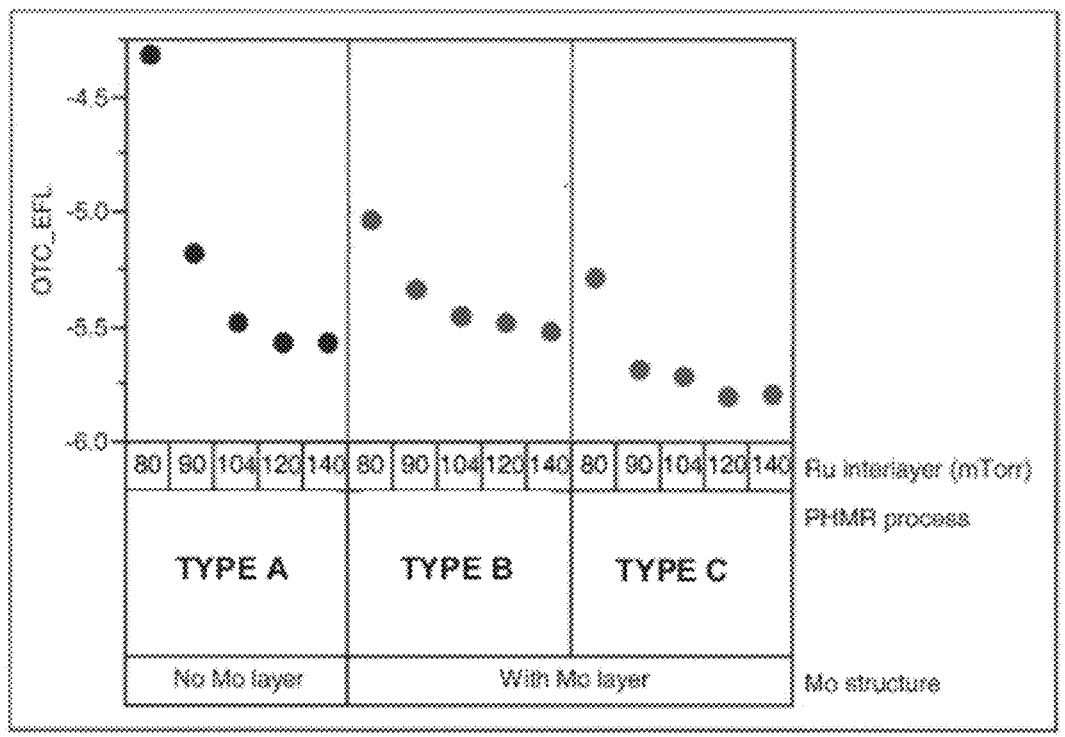

FIGS. 10a and 10b are plots illustrating the on-track bit error rate (PE_EFL) and squeezed off-track bit error rate (OTC_EFL), respectively, for the 3 types of example perpendicular recording media, i.e., TYPES A-C, at the various sputtering pressures. As described above, in some instances, an increase in sputtering pressure used to form the interlayer can enhance the magnetic exchange decoupling of the magnetic layer due to the induced columnar structure. Such an increase can cause an increase in bit error rate performance. Instead of relying on a higher sputtering pressure for deposition of the interlayer to provide the increased exchange decoupling, the inserted magnetic zero layer increases the exchange decoupling at lower sputtering pressures. In this manner, the incorporation of a magnetic zero layer as in the TYPE B and C media can optimize the on-track bit error rate and squeezed off-track bit error rate at low sputtering pressures, e.g., as compared to the TYPE A examples which do not include a magnetic zero layer.

Figure 11:
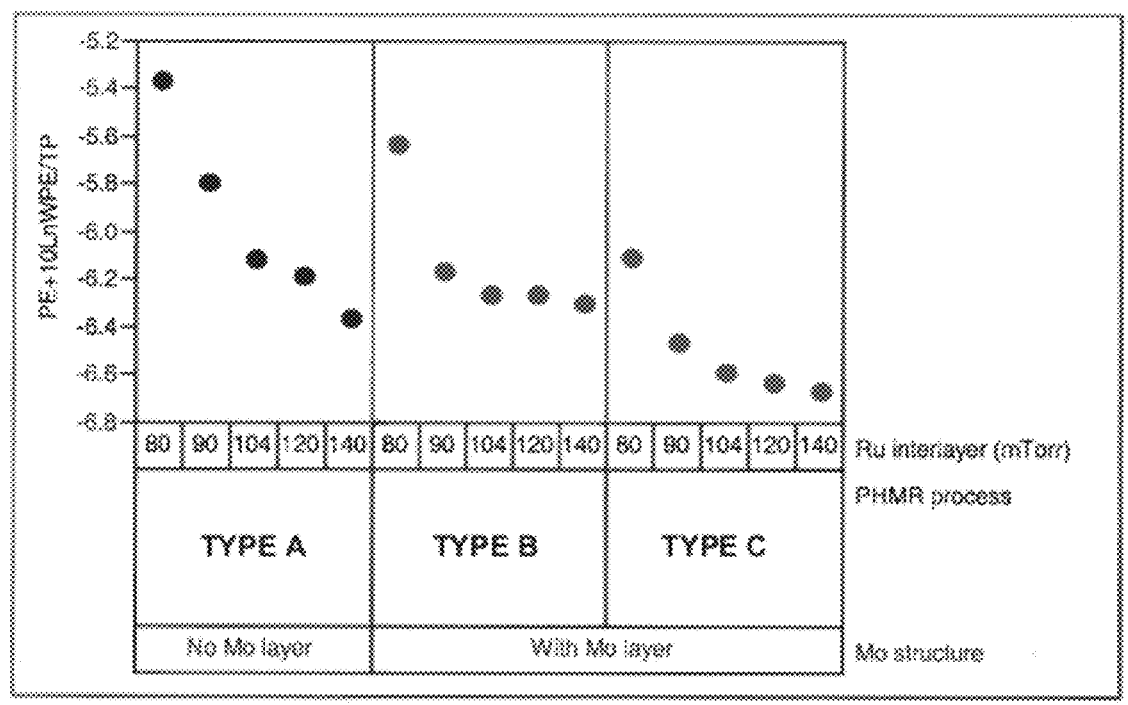
FIG. 11 is a plot illustrating the normalized on-track bit error rate by the track pitch for various types of example magnetic recording media.

FIG. 11 is a plot illustrating the normalized on-track bit error rate by the track pitch (PE+10LnWPE/TP) for the 3 types of example perpendicular recording media, i.e., TYPES A-C, at the various sputtering pressures. As shown, the examples with a magnetic zero layer (TYPE B and C) demonstrated enhanced normalized on-track bit error rate by the track pitch compared to that of the TYPE A examples. Moreover, the TYPE C examples demonstrated enhanced normalized on-track bit error rate by the track pitch compared to that of the TYPE B examples.

Figure 12:
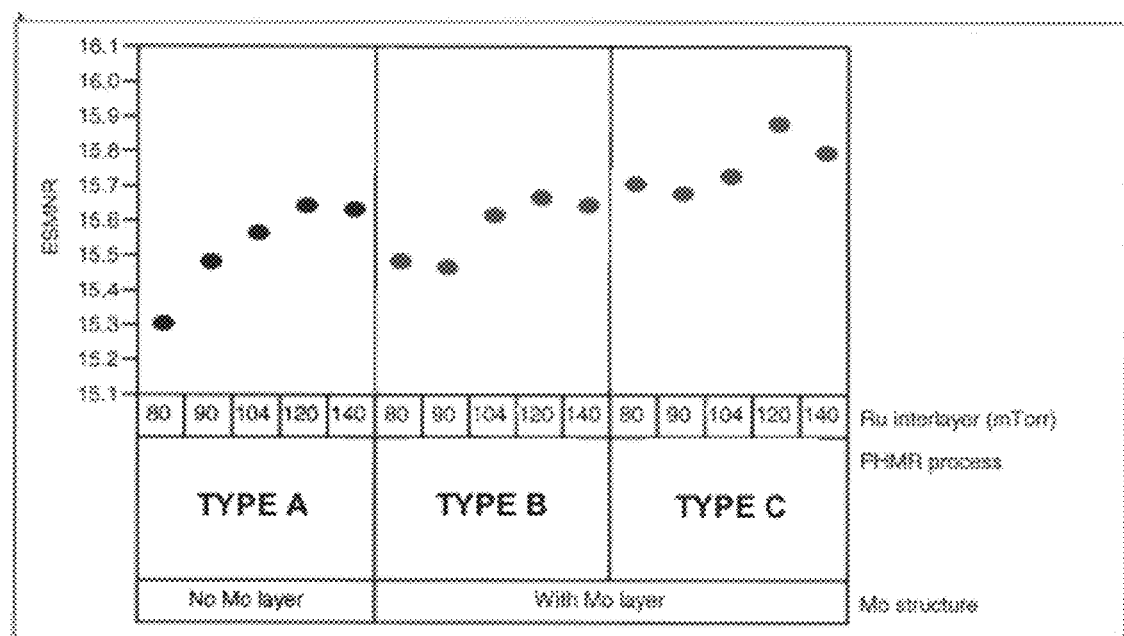
FIG. 12 is a plot illustrating media signal to noise ratio for various types of example magnetic recording media.

FIG. 12 is a plot illustrating media signal to noise ratio (ESMNR) for the 3 types of example perpendicular recording media, i.e., TYPES A-C, at the various sputtering pressures. As shown, increase in the media signal to noise ratio from the combination of the presence of the magnetic zero layer (TYPES B and C examples) and adjustment of process parameters (TYPE C examples) to control exchange decoupling is coincident with the above bit error rate performances.

Figure 13A:
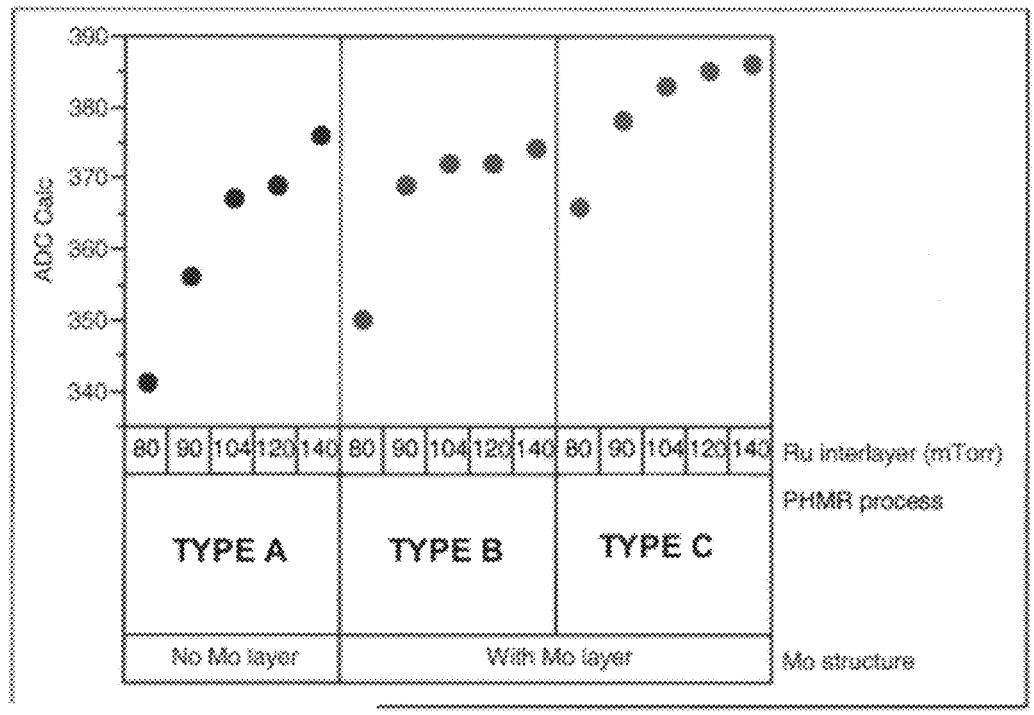
FIGS. 13a and 13b are plots illustrating calculated areal density capability (ADC cal) and measured areal density capability, respectively, for various types of example magnetic recording media.
Figure 13B:
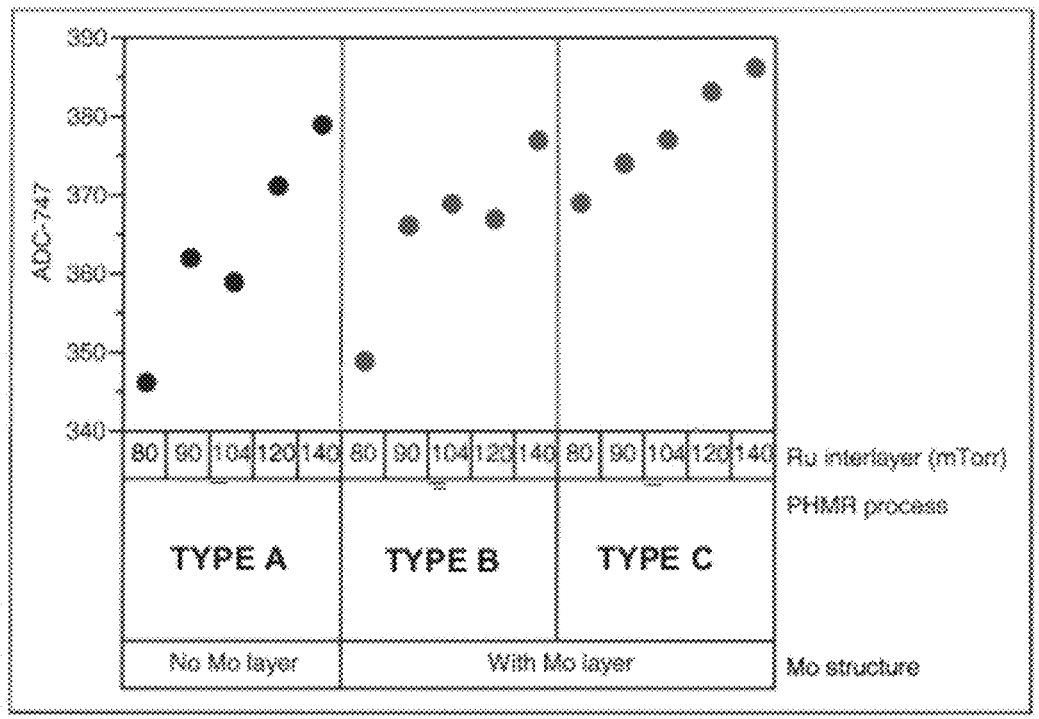

FIGS. 13a and 13b are plots illustrating calculated areal density capability (ADC cal) and measured areal density capability (ADC-747), respectively, for the 3 types of example perpendicular recording media, i.e., TYPES A-C, at the various sputtering pressures. The calculated areal density capability was calculated being equal to x(1–0.1(PE_EFL+5))/WPE, where x equals kilo bits per square inch, PE_EFL equals on-track bit error rate, and WPE equals magnetic writing width.

As shown in FIGS. 13a and 13b, the combination of the presence of the magnetic zero layer (TYPES B and C examples) and adjustment of process parameters (TYPE C examples) increased the areal recording densities, per the calculated and actual measurements, as compared to the TYPE A examples.

This disclosure includes several numerical ranges that can be practiced throughout the disclosed numerical ranges.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. A stack, comprising:
   a crystallographic orientation interlayer;
   a magnetic zero layer disposed on the interlayer, the magnetic zero layer being non-magnetic and comprising non-magnetic grains separated by a non-magnetic segregant; and
   a magnetic recording layer disposed on the magnetic zero layer, the magnetic recording layer comprising ferromagnetic grains separated by a non-magnetic segregant, wherein the magnetic zero layer comprises the same elements as the magnetic recording layer, a percentage by volume of the non-magnetic segregant of the magnetic zero layer is greater than a percentage by volume of the non-magnetic segregant of the magnetic recording layer, a lattice mismatch between the interlayer and the magnetic recording layer is less than about 4%, and a thickness of the magnetic zero layer is less than about 10 Å.

2. The stack of claim 1, wherein the segregant of the magnetic zero layer and the segregant of the magnetic recording layer comprise the same material.

3. The stack of claim 1, wherein the magnetic zero layer comprises the same elements in different proportions as the magnetic recording layer.

4. The stack of claim 1, wherein the segregant of the magnetic zero layer is an amorphous material.

5. The stack of claim 1, wherein the magnetic zero layer comprises a Co alloy having between about 40 mol % and about 60 mol % Co.

6. The stack of claim 1, wherein the segregant of the magnetic zero layer comprises an oxide material and the segregant of the magnetic recording layer comprises the oxide material.

7. The stack of claim 6, wherein the magnetic zero layer comprises greater than about 5 mol % of the oxide material.

8. The stack of claim 6, wherein the magnetic zero layer comprises greater than about 10 vol % of the oxide material.

9. The stack of claim 6, wherein the magnetic zero layer comprises a greater percentage of the oxide material than the magnetic layer.

10. The stack of claim 1, wherein the magnetic recording layer comprises a first magnetic layer adjacent the magnetic zero layer and a second magnetic layer separated from the first magnetic layer by an exchange break layer.

11. The stack of claim 1, wherein the grains of the magnetic zero layer are columnar grains having an HCP crystalline structure and a (0001) growth direction.

12. The stack of claim 1, wherein the stack including the magnetic zero layer has increased exchange decoupling when compared to a substantially similar stack that does not include the magnetic zero layer.

13. The stack of claim 1, wherein the magnetic zero layer comprises one or more of Pt and Ru.

14. A method of making a stack, comprising:
depositing a magnetic zero layer on a crystallographic orientation interlayer, the magnetic zero layer being non-magnetic and comprising non-magnetic grains separated by a non-magnetic segregant; and
depositing a magnetic layer on the magnetic zero layer, the magnetic layer comprising ferromagnetic grains separated by a non-magnetic segregant, wherein the magnetic zero layer comprises the same elements as the magnetic recording layer, a percentage by volume of the non-magnetic segregant of the magnetic zero layer is greater than a percentage by volume of the non-magnetic segregant of the magnetic recording layer, a lattice mismatch between the interlayer and the magnetic layer is less than about 4%, and a thickness of the magnetic zero layer is less than about 10 Å.

15. The method of claim 14, wherein the magnetic zero layer comprises CoCr- and one or more of Pt and Ru, the magnetic recording layer comprises a Co alloy, the segregant of the magnetic zero layer and the segregant of the magnetic recording layer comprises an oxide, and the magnetic zero layer comprises a higher percentage by volume of the oxide than the magnetic recording layer.

16. The method of claim 14, wherein a difference between the full width half maximum (FWHM) of crystallographic rocking curves of the interlayer and the magnetic recording layer is less than about 0.35 degrees.

17. A stack, comprising:
a crystallographic orientation interlayer;
a magnetic zero layer disposed on the interlayer, the magnetic zero layer being non-magnetic and comprising grains separated by a non-magnetic segregant, the magnetic zero layer comprising a CoCr alloy having Cr less than 30 at %; and
a magnetic recording layer disposed on the magnetic zero layer, the magnetic recording layer comprising ferromagnetic grains separated by a non-magnetic segregant, wherein a lattice mismatch between the interlayer and the magnetic recording layer is less than about 4%, a composition of the magnetic recording layer is different from composition of the interlayer, and a percentage by volume of the non-magnetic segregant of the magnetic zero layer is greater than a percentage by volume of the non-magnetic segregant of the magnetic recording layer, and a thickness of the magnetic zero layer is less than about 10 Å.

18. The stack of claim 17, wherein the CoCr alloy further includes one or more of Pt and Ru.

19. A stack, comprising:
a crystallographic orientation interlayer;
a magnetic zero layer disposed on the interlayer, the magnetic zero layer being non-magnetic and comprising non-magnetic grains separated by a non-magnetic segregant; and
a magnetic recording layer disposed on the magnetic zero layer, the magnetic recording layer comprising ferromagnetic grains separated by a non-magnetic segregant, wherein the magnetic zero layer comprises the same elements as the magnetic recording layer, a lattice mismatch between the interlayer and the magnetic layer is less than 4%, and the magnetic zero layer comprises a greater percentage by volume of the non-magnetic segregant than the magnetic recording layer, and a thickness of the magnetic zero layer is less than about 10 Å.

20. A stack, comprising:
a crystallographic orientation interlayer;
a magnetic zero layer disposed on the interlayer, the magnetic zero layer being non-magnetic and comprising grains separated by a non-magnetic segregant; and
a magnetic recording layer disposed on the magnetic zero layer, the magnetic layer comprising ferromagnetic grains separated by a non-magnetic segregant, wherein the magnetic zero layer comprises the same elements as the magnetic recording layer and the magnetic zero layer has a thickness less than 10 angstroms, a lattice mismatch between the interlayer and the magnetic recording layer is less than about 4%, and the magnetic zero layer has a thickness less than about 10 Å.

\* \* \* \* \*